US006604008B2

(12) United States Patent
Chudley et al.

(10) Patent No.: US 6,604,008 B2
(45) Date of Patent: Aug. 5, 2003

(54) SCORING BASED UPON GOALS ACHIEVED AND SUBJECTIVE ELEMENTS

(75) Inventors: Martyn Richard Chudley, Knutsford (GB); Sarah C. Chudley, Knutsford (GB); Philip Snape, Rhewl Mostyn (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/877,700

(22) Filed: Jun. 8, 2001

(65) Prior Publication Data

US 2002/0188361 A1 Dec. 12, 2002

(51) Int. Cl.$^7$ .............................................. G06F 155/00
(52) U.S. Cl. ............................ 700/92; 700/90; 700/91; 700/93; 463/1
(58) Field of Search .............................. 700/91, 92, 93; 463/7, 23, 1

(56) References Cited

U.S. PATENT DOCUMENTS

| | | | | |
|---|---|---|---|---|
| 4,103,895 A | * | 8/1978 | Pressman et al. ............. | 463/15 |
| 4,130,871 A | * | 12/1978 | Olsen et al. ................... | 700/92 |
| 5,035,625 A | * | 7/1991 | Munson et al. ............... | 434/332 |
| 5,730,654 A | * | 3/1998 | Brown .......................... | 463/1 |
| 6,066,046 A | * | 5/2000 | Yamamoto .................... | 463/7 |
| 6,454,652 B2 | * | 9/2002 | Miyamoto et al. ............ | 463/31 |
| 6,488,505 B1 | * | 12/2002 | Hightower .................... | 434/69 |
| 6,520,858 B2 | * | 2/2003 | Matsui et al. ................. | 463/43 |

OTHER PUBLICATIONS

Instructions: California Games, circa 1991, http://skyscraper.fortunecity.com/dos/209/lynxwld/manuals/california_games.htm.*

Jung, Robert: California Games: The classic Epyx computer game arrive on Lynx. The full review. Jul. 6, 1999. http://pocket.ign.com/articles/155/155859p1.html.*

Bethesda Softworks: Hotrod Championship Drag Racing FAQ 1.0, circa 1998. http://www.bethsoft.com/gamesites/hotrod/faq.html.*

Perry, Douglass C.: SSX Hands On Impressions:Sep. 13, 2000, http://ps2.ign.com/articles/134/134022p1.html.*

Kudo: Moseley's Mad Bag of Ticks, Part 1, Jun. 1, 2001, http://ps2.ign.com/articles/095/095444p1.html.*

Perry, Douglass C.: Jonny Moseley Mad Trix: The first radical skiing game is in development and 3DO is at the helm. Nov. 29, 2001. http://ps2.ign.com/articles/136/136648p1.html.*

Scarne, John: Scarne's Encyclopedia of Card Games: ALl the Rules for All the Games You'll want to Play, 1983, p. 120–126.*

Freestyle Skiing, Moguls, web page, available http://www.saltlake2002.com/ats/fr/fr_competition_moguls.html. Printed May 14, 2001, 1 pg.

(List continued on next page.)

*Primary Examiner*—Michael O'Neill
*Assistant Examiner*—Christina M. Marks
(74) *Attorney, Agent, or Firm*—Ronald M. Anderson

(57) ABSTRACT

A scoring method and system for determining points in a game. Goal-based points are determined as a function of a player achieving a goal set by the player that is not predefined by the game and are used to determine the player's status in the game, such as whether the player advances to a next level. Subjective style points are awarded if the player performs feats of style that are not necessary tasks of the game, depend upon the type of game, and may include sliding, spinning, jumping, blocking an opponent, passing an opponent, and avoiding obstacles. Objective skill points may be combined with subjective style points and goal-based points. Alternatively, one of these three types of points may be modified as a function of one or both of the other two types of points.

22 Claims, 10 Drawing Sheets

OTHER PUBLICATIONS

Snowboarding, Parallel giant slalom web page, available http://www.saltlake2002.com/ats/sn/sn_competition_slalom.html. Printed May 14, 2001, 1 pg.

Snowboarding, Halfpipe web page, available http://www.saltlake2002.com/ats/sn/sn_competition_halfpipe.html. Printed May 14, 2001, 2 pp.

DailyRadar.com Review—Rumble Racing web pages, available http://www.dailyradar.com/reviews/game_review_1361.html?partner=zone. Printed Jun. 21, 2001, 3 pp.

SSX—Game Rankings web page, available http://www.gamerankings.com/htmlpages3/3426.asp. Printed May 14, 2001, 1 pg.

"The Adrenaline Vault Review of SSX," web article. EA Sports, publisher. M. Laidlaw, reviewer. Published Dec. 1, 2000. Available http://www.avault.com/consoles/reviews/ps2/print_review.asp?game=ssx. Printed May 14, 2001, 5 pp.

SSX Playstation2 Game Review in Absolute Playstation2 (PS2)—SSX web article. EA Sports, Developer. Available http://www.absolute-playstation.com/ssx/ssx_review.htm. Printed May 14, 2001, 4 pp.

Treyarch LLC web page. Games for Sale, Tony Haw Pro Skater. Available http://www.treyarch.com/tonyb.html. Printed May 14, 2001, 1 pg.

* cited by examiner

SCORING BASED UPON GOALS ACHIEVED AND SUBJECTIVE ELEMENTS

FIELD OF THE INVENTION

This invention generally relates to point scoring for games, and more particularly, to a point scoring method and system that enables a player to obtain points during a game in relation to a performance goal set by the player, and in relation to the player's style of play as well as the player's skill in accomplishing tasks during play of the game.

BACKGROUND OF THE INVENTION

Many games enable a player to obtain points for successfully completing certain defined tasks of the game. For example, points may be awarded to a player for completing a task in a game in less time than any other player, or in less than a predefined target time. Alternatively, points are often awarded to a player who destroys one or more opponents. Such games reward a player based on the player's objective skill in playing the game, but do not include any provision for awarding points based upon the style applied by the player in completing a task of the game. Completion of objective tasks is the only measure of success in the game.

However, the style or flair with which a player performs a task in a game that only normally rewards successful completion of the task is often what makes a game more interesting for a player and observers. For example, professional athletes are often revered not just for their ability to perform the objective tasks of a game, but also for the finesse with which they perform the tasks. A basketball player is often considered exceptional if the player can remain in the air for a long time before slam dunking the ball through the net. However, basketball does not award any points for the style of play, but only awards the same two points for any baskets that have been successfully made.

An example of an electronic skill-based game is RIDGE RACER® by Namco, Ltd. RIDGE RACER simulates automobile racing and runs on a PLAYSTATION™ game console, produced by Sony Computer Entertainment, Inc. In this game, the player races an automobile on a track against five opponents. At each level of the game, the player must win the race in order to progress to a more difficult level. In addition, at each level of the game, the player must reach each of a number of "split lines" within a predefined time limit. The same limit is set, regardless of the player's skill and finesse. If the player fails to reach the first split line within the predefined time limit, the player must race again at the same level. An unskilled player may have to repeat the same race numerous times before achieving all of the split line times and winning the race to progress to the next level. This type of game can thus be very frustrating to new players. Conversely, a skilled player may win the race easily, performing amazing overtakes of opponent cars, doing awesome power slides, performing cool "two wheel" turns around a sharp bend, and avoiding all collisions. For this skilled player, the lower levels may be boring. Despite the additional skill, the reward is the same; the skilled player simply is allowed to progress to the next level.

Some games attempt to address this problem by enabling a player to choose a setting of novice, intermediate, or expert before beginning play of the game. However, even with these additional refinements, the underlying game remains the same. Specifically, the player must beat the opponents and/or predefined time limits to progress to the next level. There are no additional rewards for a player performing a task better than the skill setting (i.e., novice, intermediate, expert) chosen by the player. There are also no additional rewards for a player performing stylish feats that are not required tasks of the game.

Conversely, in some games the winner is the player who best performs feats of style. Such games generally award a subjective score for graceful performance of tasks that have varying degrees of difficulty. Typically, a subjective score for each task is multiplied by the degree of difficulty of the task. For example, an electronic skateboarding game called TONY HAWK'S PRO SKATER™, by Treyarch, Inc., requires a player to perform skateboarding tricks of varying difficulty to obtain points. When enough points are obtained, the player is rewarded with another skateboard or is advanced to the next level.

Another electronic game, called SSX™, by Electronic Arts, Inc., combines some aspects of style with racing to cross the finish line first. However, in this game, style and racing still remain separate, in terms of advancing within the game. The game is based on the sport of snowboarding, and a player must win at one level to advance to the next level. SSX players compete in two types of events. The first type of event is a race. If a player wins the final round of a race, the player is awarded a medal for the course, and is allowed to proceed to another course. The other type of event is the "showoff round," where the player is awarded a medal, and allowed to proceed to another course, based on the player's total score after a single run. In the showoff round, points are awarded for snowboard tricks, which include jumps and grabs.

These two events are somewhat similar to those in the OLYMPIC™ snowboarding competition. According to the official Web site of the Salt Lake City 2002 Olympic Winter Games, athletes will compete in a "Giant Slalom" event, and the final competitors will be determined by their qualifying times and by winning in preliminary events. In addition, athletes will compete in a "Halfpipe" event that is based only on subjective judging of style and ability to do tricks.

The OLYMPIC event of Freestyle Mogul Skiing combines aspects of time and form in a split-scoring system. In this sporting event, judges evaluate an athlete's turns and jumps over moguls to award seventy-five percent (75%) of an athlete's points for a run. The speed of the skier through the run determines the remaining twenty-five percent (25%) of the athlete's score. The athlete's run time is compared to a predetermined pace-setter's time to determine the number of points for the athlete's speed. An athlete receives (or loses) a predetermined number of points for each incremental percentage difference from the pace-setter's time to complete the run. In short, the sport is primarily subjective, based on form, but includes a minor component of scoring based on objective time. Currently, there does not appear to be any electronic game that implements the split-scoring method of Olympic Freestyle Mogul Skiing.

The electronic snowboarding game, SSX, discussed above, includes a minor style aspect to the racing events, but a winner is primarily determined based upon objective race event results. Besides the separate "showoff round," a player can perform optional tricks during a race event, which indirectly enhance the player's speed. Every time a trick is landed successfully, an "adrenaline meter" fills up with "boost." Boost passively increases the player's base speed, and boost may be expended for a burst of speed. However, the game still requires a player to win the race in order to advance to the next level. A player cannot lose the race, yet still obtain enough trick points to advance to the next level.

Further, even if a player performs better than the player expected of himself or herself, the player will still not advance to the next level without winning the race. The game itself sets the targets and goals for a player. The races and the goals listed are predefined (e.g., compete against the other players and pass the finish line first). Even though SSX includes some aspects of style in racing, the game is fundamentally the same as simple games, such as RIDGE RACER, because a player must win the race to advance to the next level. Again, an unskilled player may be frustrated by having to repeat the same race numerous times before progressing to the next level. Conversely, a skilled player may be bored by having to go through the lower levels without direct reward for great style.

Some other games enable a player to wager on the player's performance. Wagers may be for money or for other rewards, such as another car to use in the game. For example, a simulated boxing game called READY 2 RUMBLE™, by Midway Home Entertainment, Inc., enables a player to wager on beating an opponent in the ring. If successful, the player receives simulated money to spend on additional skills or other simulated rewards in the game. However, there are no style aspects to the game, and the game does not enable a player to wager on anything other than winning a boxing match.

It would therefore be desirable to address the above problems by providing a combined scoring system for use in a game that enables a player to score and progress in the game via a common point system. It would also be desirable to enable a player to benefit from the player's style of performance in games that don't normally (or don't primarily) include points awarded for a player's style as part of the game. Moreover, it would be desirable to provide a game scoring system that enables a player to set goals for a game that if successfully achieved, will result in points being awarded the player. Thus, a scoring system addressing these issues would provide the following two benefits individually or in combination:

- enable players to SET THEIR OWN GOALS in the game—e.g., set the parameters for completing a race or challenge in order to win more points; and/or
- enable players to advance based not only on their results in the race or challenge, but also based on how STYLISHLY they achieve those results, especially in games that do not normally (or not primarily) include a style aspect as part of the points awarded in the game.

SUMMARY OF THE INVENTION

In one aspect of the present invention, a game scoring method and system provides for determining points as a function of a player's performance in relation to achieving a goal set by the player. Instead of the game defining the performance goal, the player is able to set a goal, such as specifying a time within which the player will complete a task, or indicating a number of opponents that the player will beat, or specifying a handicap the player will overcome, or identifying a relative position in which the player will finish a portion of the game. These goal-based points are preferably used to determine a player's status in the game, such as determining whether the player will advance to a next level. A predetermined number of goal-based points may be awarded if the player meets the goal set by the player. Alternatively, the goal-based points awarded will be determined as a function of the amount by which the player exceeds the goal that was set. In a further variation, the player may be enabled to gamble that the player will achieve the goal, and may gamble a joker or wildcard that magnifies the player's points.

In another aspect of the present invention, subjective style points are determined based on the player's performance with relation to subjective criteria. Such criteria include the technique exhibited by the player to accomplish a task of the game, or whether the player performed feats of style that are not necessary to complete a task of the game. Style feats depend on the type of game or the activity being scored. For example, a racing game may include style feats such as sliding, spinning, jumping a vehicle into the air (or running on two wheels), blocking an opponent, passing an opponent, and avoiding obstacles. A search-and-destroy game may include style feats such as somersaulting before destroying an opponent, twirling a weapon, and shooting backward over the player's shoulder to destroy an opponent instead of facing the opponent and shooting forward.

The invention may further determine and use objective skill points based on the player's performance with relation to objective criteria, such as time, position, speed, or other physical parameters. Objective skill points may be combined with subjective style points and goal-based points. Alternatively, one of the types of points may be modified as a function of one, or both, of the other two types of points. For example, objective skill points may be multiplied by a factor that is a function of the subjective style points.

Another aspect of the present invention is directed to an electronic system that implements the above scoring method. Such a system may be an electronic game or an electronic scoring system utilized to score a non-electronic game. A further aspect of the present invention is directed to a machine readable medium on which are stored machine instructions that generally cause a processing device to perform the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the invention is described below with relation to an electronic gaming system, and more specifically with relation to a simulated automobile racing game played on an electronic gaming system. Those skilled in the art will recognize that the present invention may also be implemented in an arcade game, in a hand-held device that executes a game, in a personal computer, as an electronic scoring system applied to a non-electronic game or sport, and in other systems for applying points to an activity.

Gaming System

Figure 1:
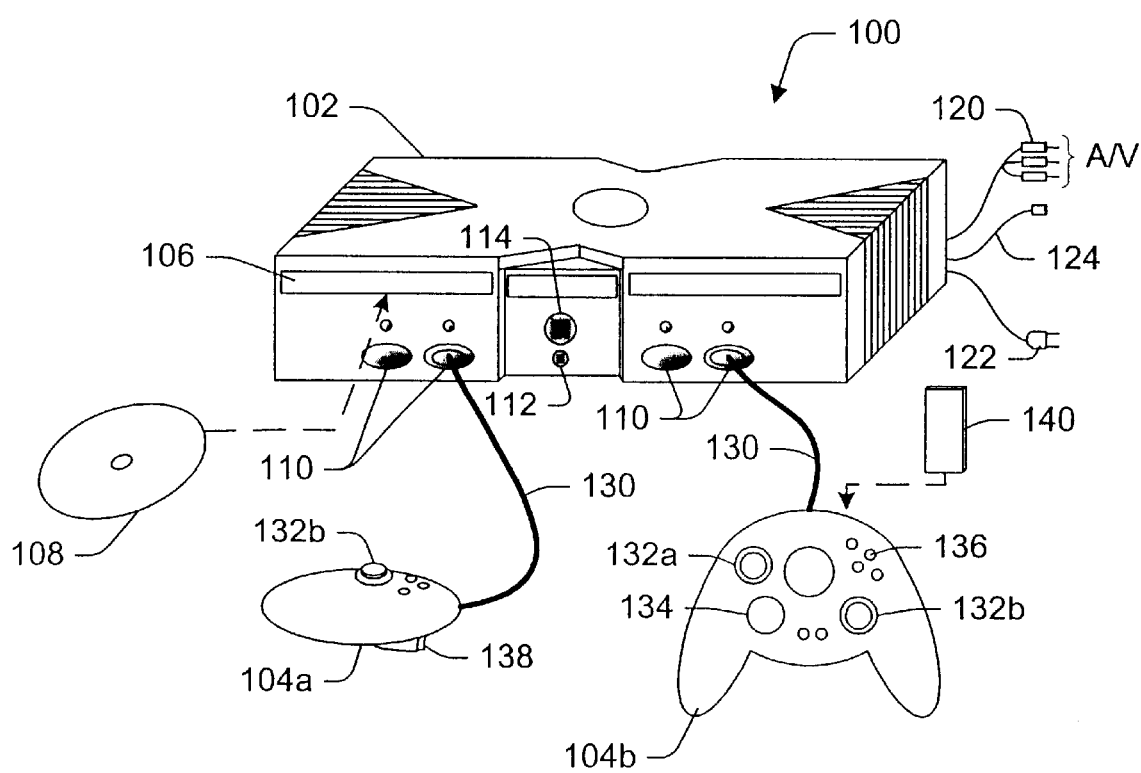
FIG. 1 is a schematic isometric view of a gaming system, which is suitable for use in implementing the present invention.

FIG. 1 shows an exemplary electronic gaming system 100 that includes a game console 102 and support for up to four controllers, such as controllers 104a and 104b. Game console 102 is equipped with an internal hard disk drive (not shown) and a portable media drive 106 that supports various forms of portable storage media, as represented by an optical storage disk 108. Examples of suitable portable storage media include DVD disks, compact disk-read-only memory (CD-ROM), game disks, and so forth.

On a front face of game console 102 are four slots 110 for connection to and support of the controllers, although the number and arrangement of slots may be modified. A power button 112 and an eject button 114 are also positioned on the front face of game console 102. Power button 112 controls application of electrical power to the game console, and eject button 114 alternately opens and closes a tray (not shown) of portable media drive 106 to enable insertion and extraction of storage disc 108.

Game console 102 connects to a television or other display monitor (not shown) via audio/visual (A/V) interface cables 120. A power cable plug 122 provides electrical power to the game console when connected to an alternating current line source (not shown). Game console 102 may be further provided with a data connector 124 to transfer data over a network, such as the Internet, at conventional telephone modem speeds or broadband speeds.

Each controller 104a and 104b is coupled to game console 102 via a wire (or alternatively through a wireless) interface. In the illustrated implementation, the controllers are Universal Serial Bus (USB) compatible and are connected to game console 102 via USB cables 130. Game console 102 may be equipped with any of a wide variety of user interaction mechanisms. As illustrated in FIG. 1, each controller 104a and 104b is equipped with two thumbsticks 132a and 132b, a D-pad 134, buttons 136, and two triggers 138. These mechanisms are merely representative, and other known gaming mechanisms may be substituted for or added to those shown in FIG. 1.

A removable or portable memory unit (MU) 140 may be inserted into controller 104 to provide additional and portable storage. Portable MUs enable users to store game parameters and port them for play on other consoles. In the described implementation, each controller is configured to accommodate two MUs, although more or fewer than two MUs may be employed instead.

Gaming system 100 is capable of playing, for example, games, music, and videos. With different storage offerings, games and other data can be played from the hard disk drive or from optical storage disk 108 in drive 106, from an online source, or from MU 140. For example, gaming system 100 is capable of playing:

Game titles stored on CD and DVD discs, on the hard disk drive, or downloaded from an online source;

Digital music stored on a CD in portable media drive 106, in a file on the hard disk drive (e.g., Windows Media™ Audio (WMA) format), or derived from online streaming sources; and Digital AV stored on a DVD disc in portable media drive 106, or in a file on the hard disk drive (e.g., in an Active Streaming Format), or from online streaming sources.

Figure 2:
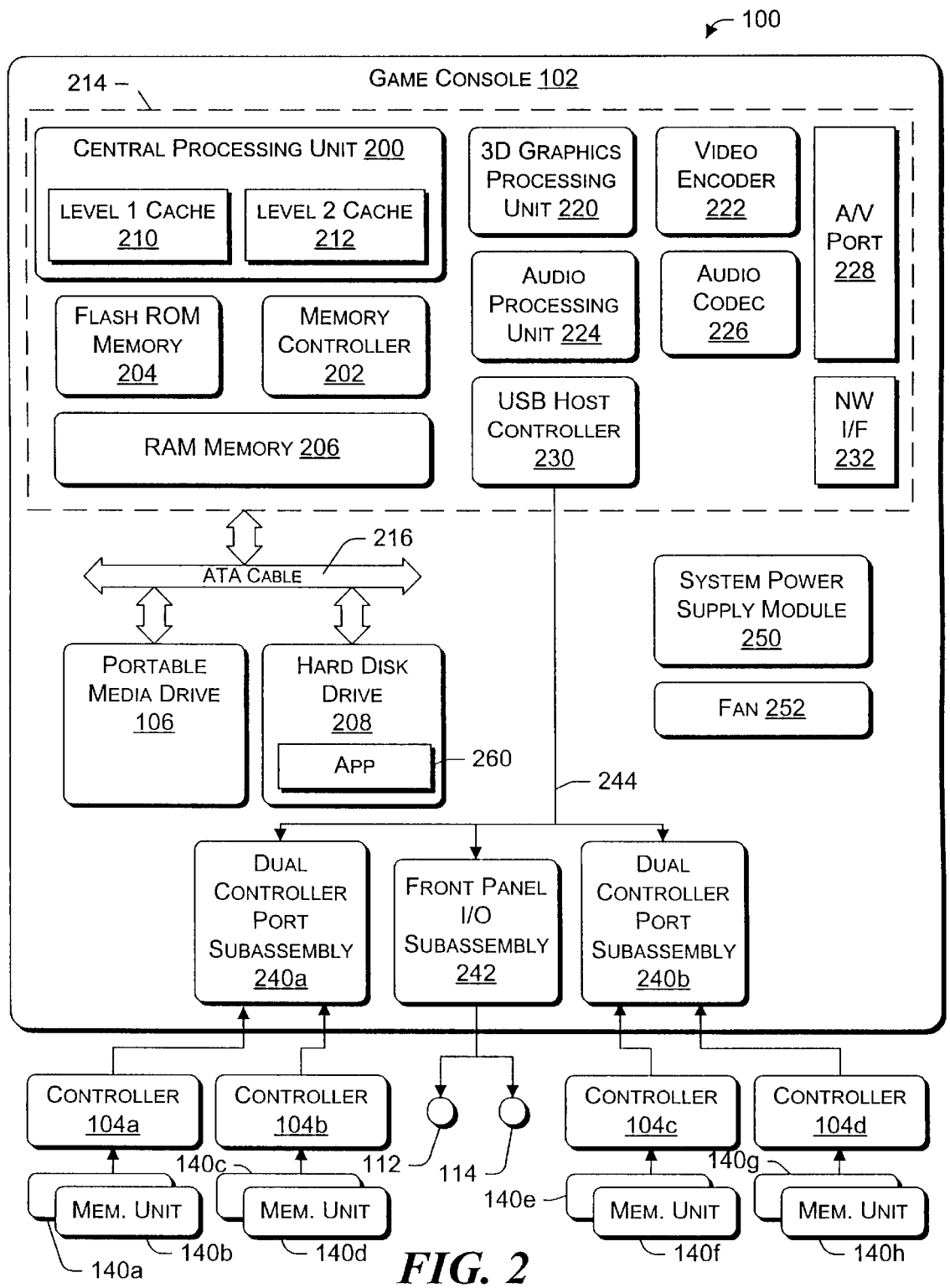
FIG. 2 is a block diagram of the gaming system of FIG. 1.

FIG. 2 shows functional components of gaming system 100 in greater detail. Game console 102 has a central processing unit (CPU) 200 and a memory controller 202 that facilitates processor access to various types of memory, including a flash read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles, thereby improving processing speed and throughput. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

As one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) that are independently controlled by memory controller 202 via separate buses (not shown). Hard disk drive 208 and portable media drive 106 are connected to the memory controller via the PCI bus and an AT Attachment (ATA) bus 216.

A 3D graphics processing unit 220 and a video encoder 222 form a video processing pipeline for high-speed and high-resolution graphics processing. Data are carried from graphics processing unit 220 to video encoder 222 via a digital video bus (not shown). An audio processing unit 224 and an audio encoder/decoder (codec) 226 form a corresponding audio processing pipeline for high fidelity and stereo processing. Audio data are carried between audio processing unit 224 and audio codec 226 via a communication link (not shown). The video and audio processing pipelines output data to an A/V port 228 for transmission to the television or other display monitor. In the illustrated implementation, video and audio processing components 220–228 are mounted on module 214.

Also implemented by module 214 are a USB host controller 230 and a network interface 232. USB host controller 230 is coupled to CPU 200 and memory controller 202 via a bus (e.g., the PCI bus), and serves as a host for peripheral controllers 104a–104d. Network interface 232 provides access to a network (e.g., the Internet, home network, etc.) and may be any of a wide variety of various wire or wireless interface components, including an Ethernet card, a modem, a Bluetooth module, a cable modem, and the like.

Game console 102 has two dual controller support subassemblies 240a and 240b, with each subassembly supporting two game controllers 104a–104d. A front panel input/output (I/O) subassembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight MUs 140a–140h are illustrated as being connectable to four controllers 104a–104d, i.e., two MUs for each controller. Each MU 140 offers additional storage on which games, game parameters, and other data may be stored. When inserted into a controller, MU 140 can be accessed by memory controller 202.

A system power supply module 250 provides power to the components of gaming system 100. A fan 252 cools the circuitry within game console 102.

To implement the present invention, a software application 260 comprising machine instructions is stored on hard disk drive 208. Alternatively, the machine instructions are stored on other storage media (or downloaded over the network). When the game console is powered on, various portions of software application 260 are loaded into RAM 206 and/or caches 210, 212 and executed by CPU 200. Software application 260 is described below in greater detail.

Gaming system 100 may be operated as a standalone system by simply connecting the system to a television or other display monitor. In this standalone mode, gaming system 100 enables one or more players to play games, watch movies, or listen to music. However, with conventional modem or broadband connectivity to the Internet or other network made available through network interface 232, gaming system 100 may be further operated as a component of a larger network gaming community.

Network Gaming

Figure 3:
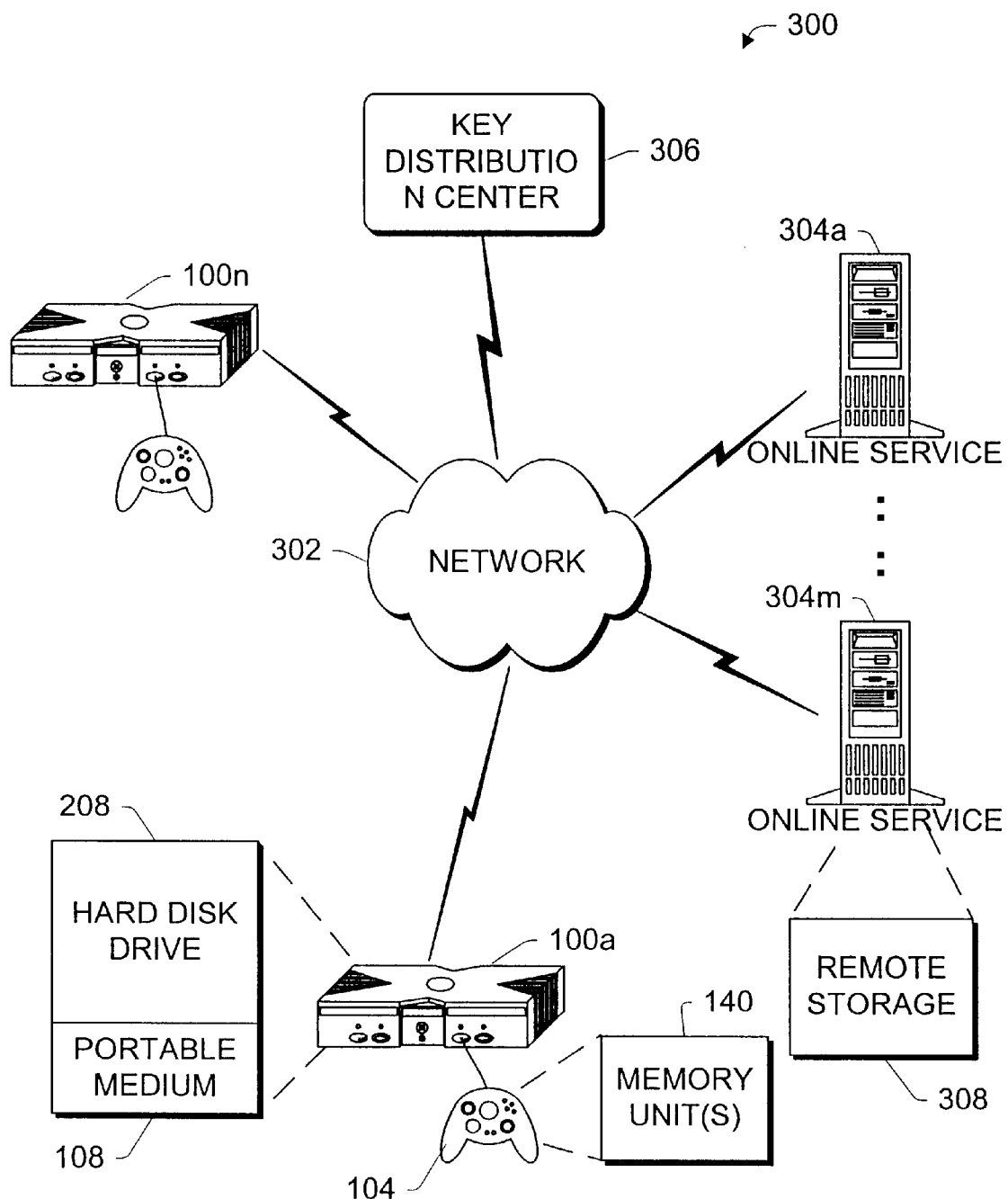
FIG. 3 illustrates a network gaming system in which the gaming system of FIG. 1 is connected via a network to other consoles and services.

FIG. 3 shows an exemplary network gaming environment 300 that interconnects multiple gaming systems 100a, . . . 100n via a network 302. Network 302 represents any of a wide variety of data communications networks and may include public portions (e.g., the Internet), as well as private portions (e.g., a residential Local Area Network (LAN)). Network 302 may be implemented using any one or more of a wide variety of conventional communications configurations including both wired and wireless types. Any of a wide variety of communications protocols can be used to communicate data via network 302, including both public and proprietary protocols. Examples of such protocols include TCP/IP, IPX/ISPX, NetBEUI, etc.

In addition to gaming systems 100, one or more online services 304a, 304m may be accessible via network 302 to provide various services for the participants, such as hosting online games, serving downloadable music or video files, hosting gaming competitions, serving streaming A/V files, and the like. Network gaming environment 300 may further employ a key distribution center 306 that plays a role in authenticating individual players and/or gaming systems 100 to one another as well as to online services 304. Distribution center 306 distributes keys and service tickets to valid participants that may then be used to form games including multiple players or to purchase services from online services 304.

Network gaming environment 300 introduces another memory source available to individual gaming systems 100, i.e., online storage. In addition to optical storage disk 108, hard disk drive 208, and MU(s) 140, gaming system 100a can also access data files available at remote storage locations via network 302, as exemplified by remote storage 308 at online service 304m.

Exemplary Game—Auto Racing

Figure 4:
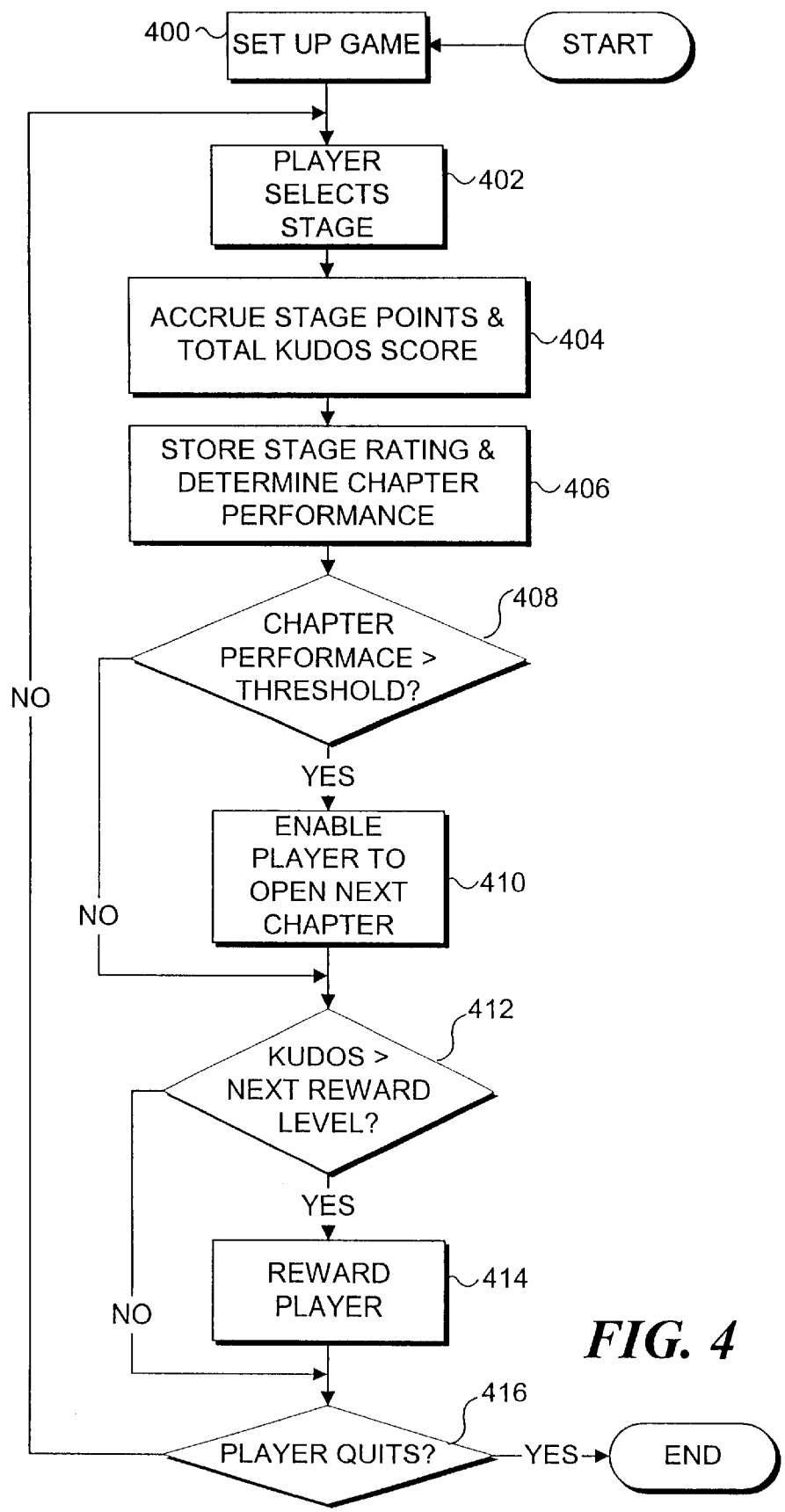
FIG. 4 is a flow diagram of logic used to determine advancement and other rewards in an exemplary automobile racing game.

The logic shown in FIG. 4 is used to determine advancement of a player to a new level and other rewards in an exemplary automobile racing game. At a step 400, the game is initialized and parameters are set up for beginning play of the game. For example, a player may obtain a car by selecting from a set of cars available to the player's current level. Alternatively, the player may need to win a car through a standard challenge race, or by other means. Additional setup steps may include selecting a city in which to race, or another racing environment. The player may select from among additional game options, such as muting sound or disclosing cheats.

When the game is setup, the player may go to a first chapter of stages, or to a previously accessed chapter of stages. Preferably, the game includes multiple chapters, each chapter comprising multiple stages. To open or advance to another chapter, the player must successfully complete a number of stages within one chapter. The player successfully completes a stage by achieving a player-adjustable goal in the stage. A stage is preferably a type of race that is played independent of other races (i.e., independent of other stages). Optionally, a stage may be a portion of a single race. Examples of various stages include:

Hotlap—the player races against the clock for one or more laps of the race track to complete one of the laps within a target time;

Timed Run—the player races against the clock to complete a preset number of laps (e.g., three laps) of the race track within a target;

Speed Challenge—the player races against the clock (and optionally against opponents) to maintain an average speed during one or more laps of the race track;

Pass Challenge—the player races against a number of opponents, and attempts to pass as many opponents as possible in one or more laps of the race track;

One-on-one—the player races against one opponent for one or more laps of the race track, and attempts to beat the opponent, possibly after providing the opponent with a head start; and Street Race—the player races against two or more opponents for one or more laps of the race track, and attempts to beat at least one of the opponents, although not necessarily all of the opponents.

At a step 402, the player selects a stage from among the number of stages in the current chapter. After selecting a stage, the player plays the stage (e.g., drives the race), and accrues stage points at a step 404. Accrual of stage points depends on a variety of reward actions involving objective skill and subjective style. Points are awarded for successfully performing objective skill tasks and for successfully performing subjective style feats. Objective skill tasks are undertakings that must be achieved by the player to complete a current stage. Examples include completing a run around a portion of the race track, finding shortcuts, or picking up fuel packs. Conversely, subjective style feats are optional actions, such as doing a power slide during the race. Further details regarding style feats are discussed below.

If the player successfully completes a stage, the stages points are applied to a Kudos score. The Kudos score is a total number of points accrued in the game from all stages previously raced by the player, in all chapters previously accessed. As discussed in further detail below, the Kudos score may be used to determine the player's advancement in the game, and/or to provide the player with other rewards.

Preferably, after completing a stage, the accrued stage points are used to determine a stage rating of the player's performance in the stage. The stage rating may be a numerical value relative to some standard, such as a scale of one (1) to ten (10). Alternatively, the stage rating may be one of a number of discrete levels, such as gold, silver, or bronze. The stage rating may also be zero or blank, representing the player's failure to achieve the player's desired goal for the stage.

The stage rating is determined and stored at a step 406. Also, an overall chapter performance is determined, or revised, based on the most recent stage rating. The chapter performance is a function of the stage ratings obtained from the stages played so far in the chapter. Preferably, chapter performance determines whether a player is permitted to access the next chapter. In this manner, chapter performance is indirectly based on points accrued for objective skill tasks and subjective stylish feats. The relationship is indirect, because chapter performance is based on stage ratings, which are based on stage points, and stage points are based on both objective skill tasks and subjective stylish feats. Alternatively, the chapter performance may be based directly on the Kudos score.

At a decision step 408, the current chapter performance is compared against a chapter threshold level to determine whether the player will be permitted to access the next chapter. If the current chapter performance exceeds the chapter threshold level, the player is enabled to access the next chapter at a step 410. Otherwise, the total Kudos score is compared with a next reward level, at a decision step 412. As indicated above, the total Kudos score may be used separately to obtain rewards instead of determining whether a player can advance to a new chapter. For example, at a step 414, based upon the Kudos score, the player may be offered a higher-performance car, special components for the player's car, or other indirect rewards. Also as indicated above, the total Kudos score may optionally be used to directly reward the player with earlier advancement to a new chapter.

At a decision step 416, the logic determines whether the player has chosen to quit the game. If the player chooses to quit, the game simply ends. Alternatively, control returns to step 402, where the player may select another stage to play, or may repeat the previous stage.

Figure 5:
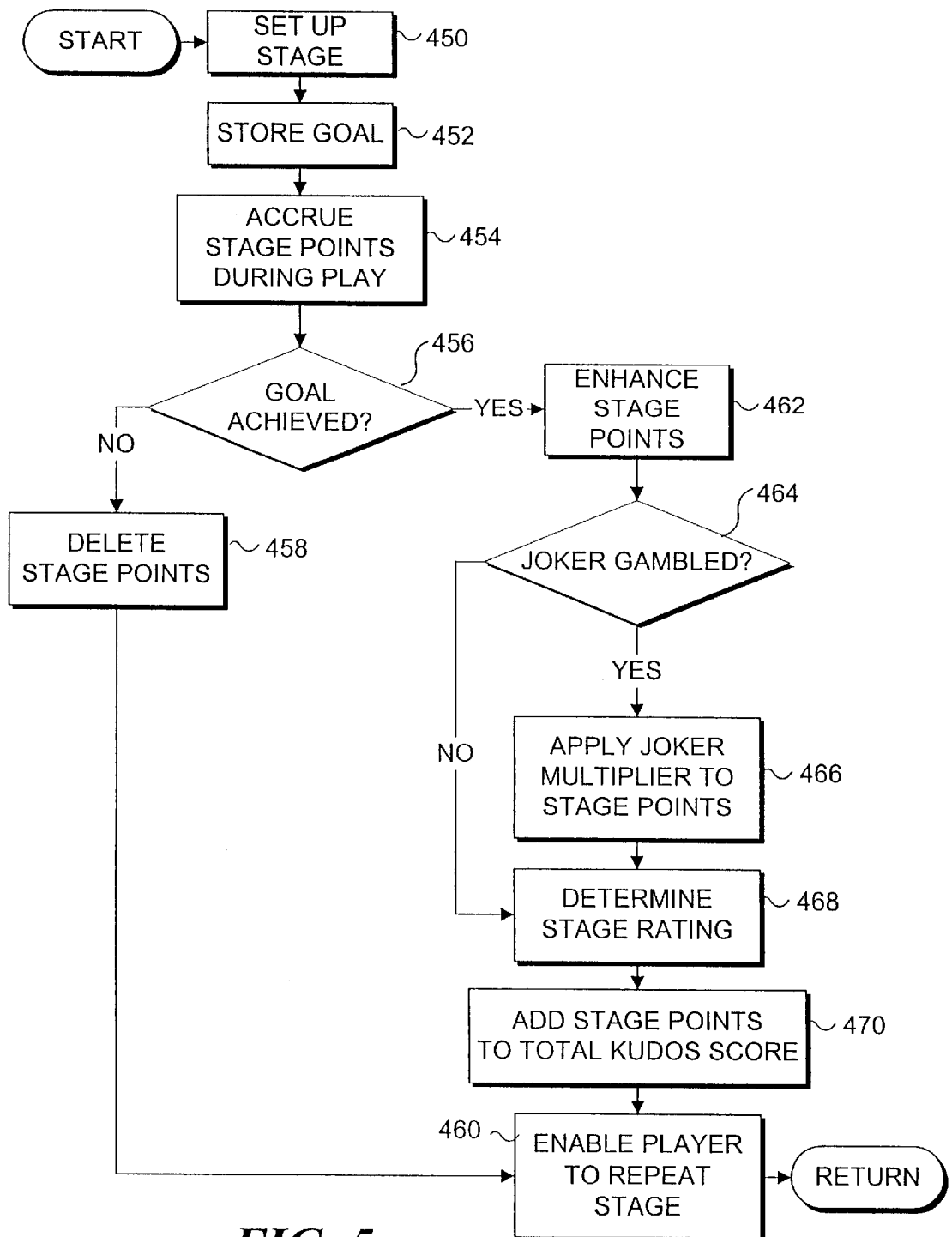
FIG. 5 is a flow diagram of logic used to determine stage points and a stage rating based on a player-defined goal, objective skill tasks, and subjective style feats, in the automobile racing game of FIG. 4.

FIG. 5 illustrates how stage points and a stage rating are determined, based on a player-set goal in the automobile racing game. At a step 450, the stage is initially set up for play. For example, options that are specific to the stage can be chosen, such as the particular car used by the player, music that will play during the stage, or other options. At a step 452, a player-adjustable goal is established and stored. Further detail on setting a goal is provided below with regard to FIG. 6. Once a goal is established, the selected stage is executed, at a step 454, and stage points are accrued during play of the stage. As indicated above, stage points are a function of two kinds of reward actions. Objective reward actions, (i.e., successfully performing objective skill tasks) result in objective points being added to the running total of stage points for the player. Subjective reward actions (i.e., performing subjective style feats) result in subjective points being added to the running total of stage points for the player.

When play is complete for the current stage, the logic determines, at a decision step 456, whether the player-set goal was achieved. If the player did not achieve the goal, all points accrued for that stage are deleted at step 458. Optionally, the stage points accrued could simply be reduced as a consequence of the player not achieving the goal that was set. Alternatively, the player may even lose points from the stage points previously accumulated. At this point in the logic, since the goal was not achieved, no stage rating is determined for the stage. Instead, the game simply enables the player to repeat the stage at a step 460. Alternatively, the player may select a different stage to attempt.

If the goal is achieved, however, the stage points accrued are enhanced at a step 462. Preferably, the stage points are increased only if the player exceeded the goal. Also, preferably, the stage points are increased as a function of how difficult the goal was, and as a function of the amount by which the player beat the goal. In addition, the stage points may be further increased if the player gambles a joker, or wild card, prior to playing the stage to further gamble on achieving the goal. At a decision step 464, the game determines whether a joker was gambled by the player. If a joker was gambled, a joker multiplier is applied to the stage points at a step 466, to further increase the points obtained for the stage. If a joker was not gambled, no additional points are obtained. Optionally, the stage points may be reduced if a joker was gambled, but the player failed to achieve the goal set by the player.

Based on the stage points, the game determines a stage rating at a step 468. As indicated above, the stage rating is preferably a function of a predetermined number of points expected for the stage. The predetermined number of points expected for the stage may represent an average number of points obtained, for example, by players participating in a usability study when the game was being developed and prior to its public release. Alternatively, the predetermined number of points expected for the stage may represent an average number of points obtained by the player in previous attempts at completing the stage. Those skilled in the art will recognize that a variety of methods may be used to establish a number of points expected for the stage. Also, as indicated above, multiple levels of predetermined points may be employed, for example, to represent a gold level, a silver level, and a bronze level.

Once the stage rating is determined, the stage points are added to the player's previous total Kudos score for the game, at a step 470. The player is again enabled to repeat the stage, if desired, at a step 460. However, if the player chooses to repeat the stage and does not perform as well, the previous stage points are replaced by the stage points obtained during the second attempt. This step includes replacing the stage points with zero points if the player-adjustable goal is not achieved during the second attempt, even if it was achieved during the first attempt. The player may try to gain more points by raising the goal to a more difficult level before the second attempt, but may fail to achieve the goal during the second attempt. If the player fails to achieve the goal set during the second attempt, the stage points for the first attempt are replaced by zero points. As a result, the player's chapter performance and total Kudos score are reduced. Alternatively, a less successful second attempt could be ignored, and the previous stage points retained, which would result in the best score for the stage being retained for the player's chapter performance and total Kudos score.

Figure 6:
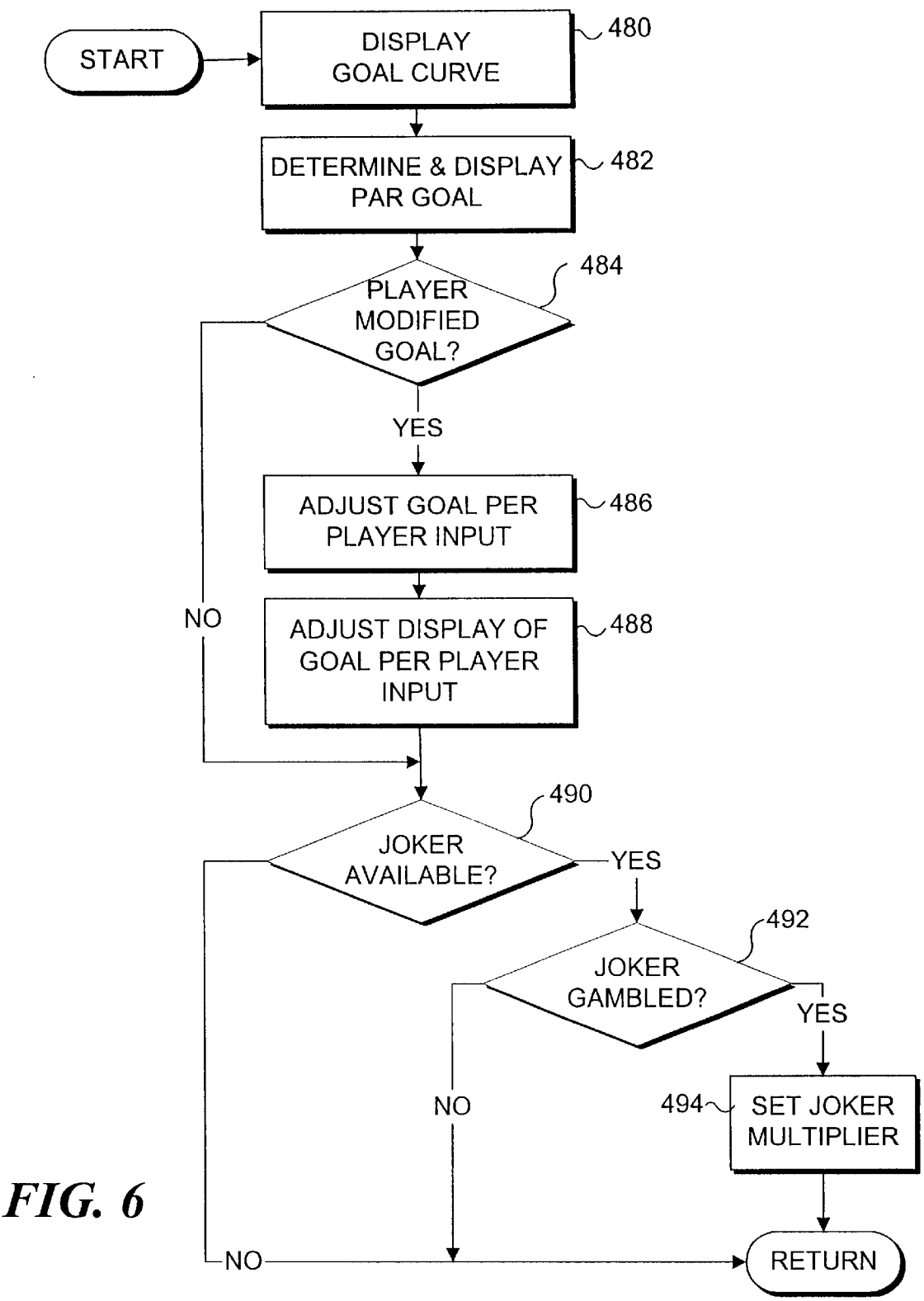
FIG. 6 is a flow diagram of logic for enabling a player to gamble on the player's own potential by setting a goal to be met in a stage of the game (e.g., in a single racing event), and gambling a joker multiplier.

FIG. 6 illustrates the logic for setting and gambling on a goal, which the player believes will be achieved. An unskilled player may set a low-performance goal in a stage to ensure achieving the goal and advancing. Conversely, a highly skilled player can set a high-performance goal, increasing the potential to obtain more points for taking a bigger risk. Preferably, a player will receive more points for setting a more difficult goal and just making it, than for setting an easy goal and surpassing it by a large amount. Thus, this scoring system rewards a player gambling with a greater risk of failure, on the player's skill potential. The player-adjustable goal for each of the above stages is as follows:

Hotlap—the time within which the player believes one lap, out of one or more laps of the race track, can be completed by the player;

Timed Run—the time within which the player believes a preset number of laps (e.g., three laps) of the race track can be completed by the player;

Speed Challenge—the average speed that the player believes can be maintained by the player during one or more laps of the race track;

Pass Challenge—the number of opponents that the player believes can be passed by the player in one or more laps of the race track;

One-on-one—the head start time that the player believes can be given to an opponent, while the player still is able to beat the opponent in one or more laps of the race track; and Street Race—the finishing position that the player expects to achieve in a race against two or more opponents for one or more laps of the race track.

To the set the appropriate goal, the game logic first determines and displays a goal curve, at a step 480. The goal curve depicts a relationship between a target parameter, such as time, and a relative number of points that will be awarded if the goal is achieved for the stage. Further discussion of the goal curve is provided below in regard to FIGS. 7A and 7B.

At a step 482 of FIG. 6, the game determines and displays a par goal that the player is expected to achieve. The par goal is a default goal predetermined for the game, based on factors known prior to beginning the stage. For example, if the player is driving a high-performance car, the player will be expected to achieve a more difficult goal than if the player were driving a low-performance car. Thus, for a high-performance car, the game will determine and display a higher par goal than if the player were driving a lower-performance car. Specifically, each car available in the game is assigned a car performance factor (CPF) that is a numerical value between 1.0 (lowest-performance car) and 4.0 (highest-performance car). The CPF of the player's selected car is applied to an average goal for the stage in determining the par goal. Other factors may also be used to determine the par goal, including the player's past performance, the race track conditions, and/or the number of opponents.

The player may select a more difficult goal that deviates from the par goal, to suit the player's preference and/or the player's own perceived skill level. At a decision step 484, the game determines whether the player modified the goal via an input device. If so, the game logic adjusts the goal, at a step 486. Correspondingly, the game adjusts the display of the goal, at a step 488. Preferably, the player is limited in adjusting the goal to within a minimum and a maximum value, so as to make the goal worth achieving.

As indicated above, the player may further gamble on the player's performance in the stage by using a joker prior to beginning the stage. At a decision step 490, the game first determines whether the player has a joker available. A joker may have been previously awarded to the player for reaching a predefined level of total Kudos points, reaching a predefined level of stage points for a previous stage, or for reaching some other level of performance. If the player has a joker available, the game determines at a decision step 492, whether the player has chosen to gamble the joker. If the player has elected to gamble the joker, the game sets a joker multiplier at a step 494. After the joker multiplier is set, or if the player did not elect to gamble the joker, or if the player does not have a joker available to gamble, the goal-setting portion is complete, and control returns to the stage, which the player may then begin playing.

Figure 7A:
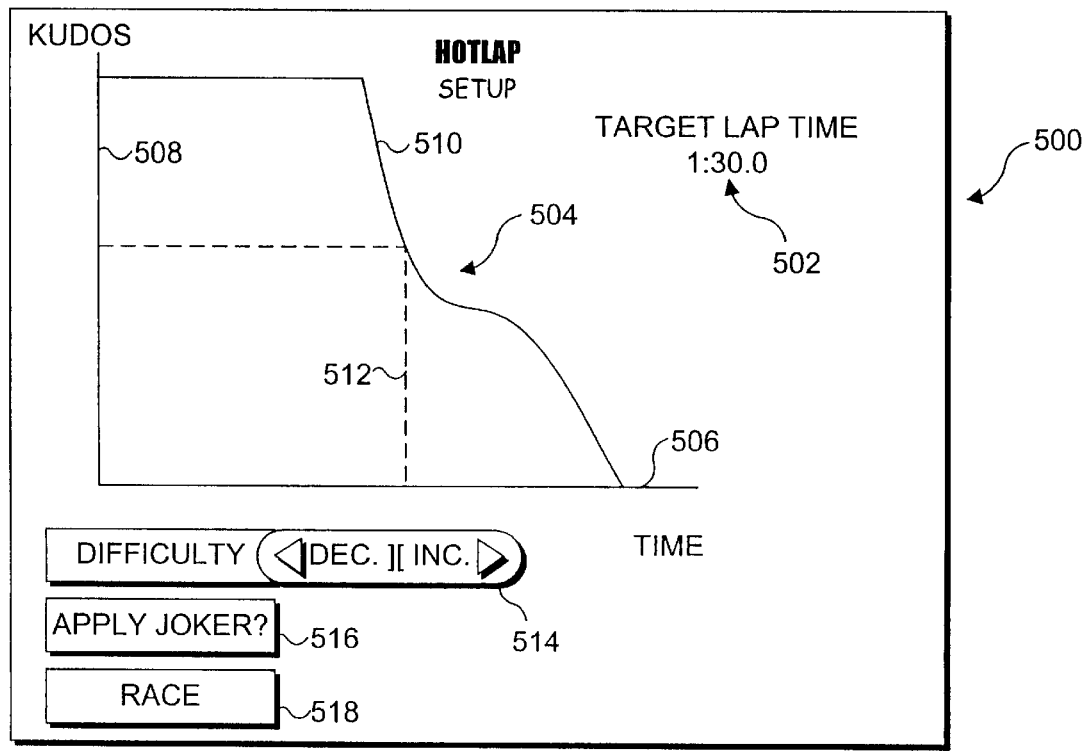
FIG. 7A is a diagram of a goal screen displayed to a player, enabling the player to select a target time to complete one lap of a race track.

To illustrate further detail of goal setting, FIG. 7A provides a diagram of a Hotlap goal screen 500 that is displayed to the player for gambling on a Hotlap stage. Hotlap goal screen 500 enables the player to select a target lap time 502 within which the player gambles that one lap of a racetrack will be completed by the player, out of one or more laps around the race track. A time goal graph 504 illustrates the relationship between target lap time 502 and a relative number of Kudos points that the player will be awarded for achieving target lap time 502. If the player achieves the goal, the Kudos points will be applied to the points obtained via objective skill tasks and subjective style feats during the Hotlap stage. Time goal graph 504 includes a horizontal time axis 506, and a vertical Kudos points axis 508. A time goal curve 510 defines the time-versus-points relationship. Preferably, the relationship defines a function that will be applied to the points obtained during the Hotlap stage. Alternatively, the relationship may define the number of Kudos points that will be added to the points obtained during the Hotlap stage.

Target line 512 tracks time goal curve 510 as a user adjusts target lap time 502 by selectively activating one of difficulty buttons 514. In this case, increasing the difficulty reduces the time within which the player believes a best lap of the racetrack will be completed by the player. Increasing the difficulty, by reducing the time, increases the relative number of Kudos points the player will be awarded for the stage, if the player completes one of the laps within the selected target time. Joker button 516 enables the player to selectively gamble the joker that the player will complete one of the laps of the racetrack within target time 512. Preferably, the number of laps in which the player is given to achieve target lap time 502, is limited. Limiting the number of laps for a Hotlap stage provides more challenge to the player by providing more incentive for the player to obtain points for achieving a difficult target lap time, rather than building up a large number of points, based on stylish feats, over an unlimited number of slower laps. Race button 518 is selected to enable the player to begin the race.

Figure 7B:
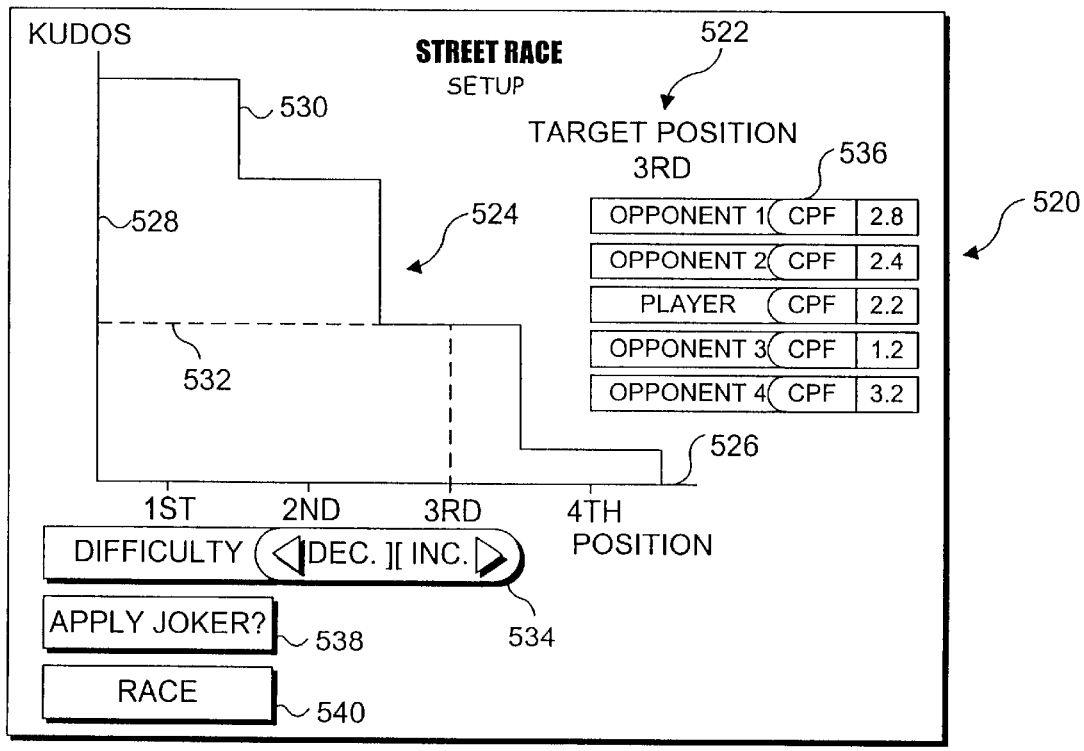
FIG. 7B is a diagram of a goal screen displayed to a player, enabling the player to select a target position in which the player believes he or she will finish a race against four other opponents.

FIG. 7B is a diagram of a Street Race goal screen 520 displayed to the player for gambling on a Street Race stage. Street Race goal screen 520 enables the player to select a target position 522 in which the player expects to finish a street race against a number of opponents (e.g., four opponents). A position goal graph 524 illustrates the relative relationship between target position 522 and a relative number of Kudos points that will be awarded for achieving the targeted position. Position goal graph 524 includes a horizontal position axis 526 and a vertical Kudos points axis 528. A position goal curve 530 defines the position-versus-points relationship. Target line 532 tracks position goal curve 530 as the player adjusts target position 522 with difficulty buttons 534. In this case, an increase in difficulty corresponds to a higher finishing position (i.e., at or nearer to the winning first place position). Conversely, decreasing the difficulty lowers the target finishing position. Preferably, the player is not allowed to set a target position of last place, so as prevent the street race from being meaningless.

Street Race goal screen 520 also includes a racers list 536. Racers list 536 identifies the CPF of the car used by the player and each opponent, assisting the player to gage the target position that might be achievable. The difference in CPF between the player's car and each opponent's car is also used to establish the relative number of points the player will receive for each finishing position. For example, the CPF of the player's car is one factor point above the CPF of the car of opponent 3. Thus, position goal curve 530 indicates that the player would not obtain very many points for finishing in $4^{th}$ position, beating only opponent 3. Conversely, the player would obtain quite a few more points for finishing in $3^{rd}$ place, by beating opponent 3 and opponent 2, who has a car with a slightly higher CPF than the player. As position goal curve 530 illustrates, the relative number of points the player might obtain increases as a function of the difference in CPF between the player's car and each opponent's car. Thus, it is significant that if the player is using a car that has a lower CPF than those of the opponents, the player may select a lower finishing position than first place, yet still be awarded points for that stage of the game by achieving the selected goal.

As discussed above, the player may also gamble a joker through joker button 538 to further benefit from successfully achieving the target position. Once satisfied with the selected goal, the player may press race button 540 to begin the race.

Also as indicated above, a player may enhance the player's stage points, regardless of the stage goal, by performing feats of style. Style feats for the exemplary automobile racing game include, but are not limited to, the following:

Power slide—sliding the car in the proper direction of travel, while the primary axis of the car is at a substantial angle relative to the direction of travel;

"J" turn—reversing the car's direction by 180 degrees in a spinning maneuver;

Donut—spinning the car 360 degrees;

Two wheeling—getting the car onto two wheels, such as by driving the car up onto a curb to bounce two wheels of one side of the car into the air;

Catching air—jumping the car into the air, such as by driving over a large hill at a high rate of speed;

Slalom—driving around cones on a coned-section of the route, without disrupting the cones;

Block—cutting off an opponent who is trying to pass;

Passing—more points are obtained for passing an opponent at a much greater speed than the opponent is traveling (i.e., "blowing by" an opponent);

Clean split—completing a section of the track without any errors in driving;

Avoiding collisions with barriers;

Avoiding collisions with other cars; and

Making a good start to the race.

Figure 8:
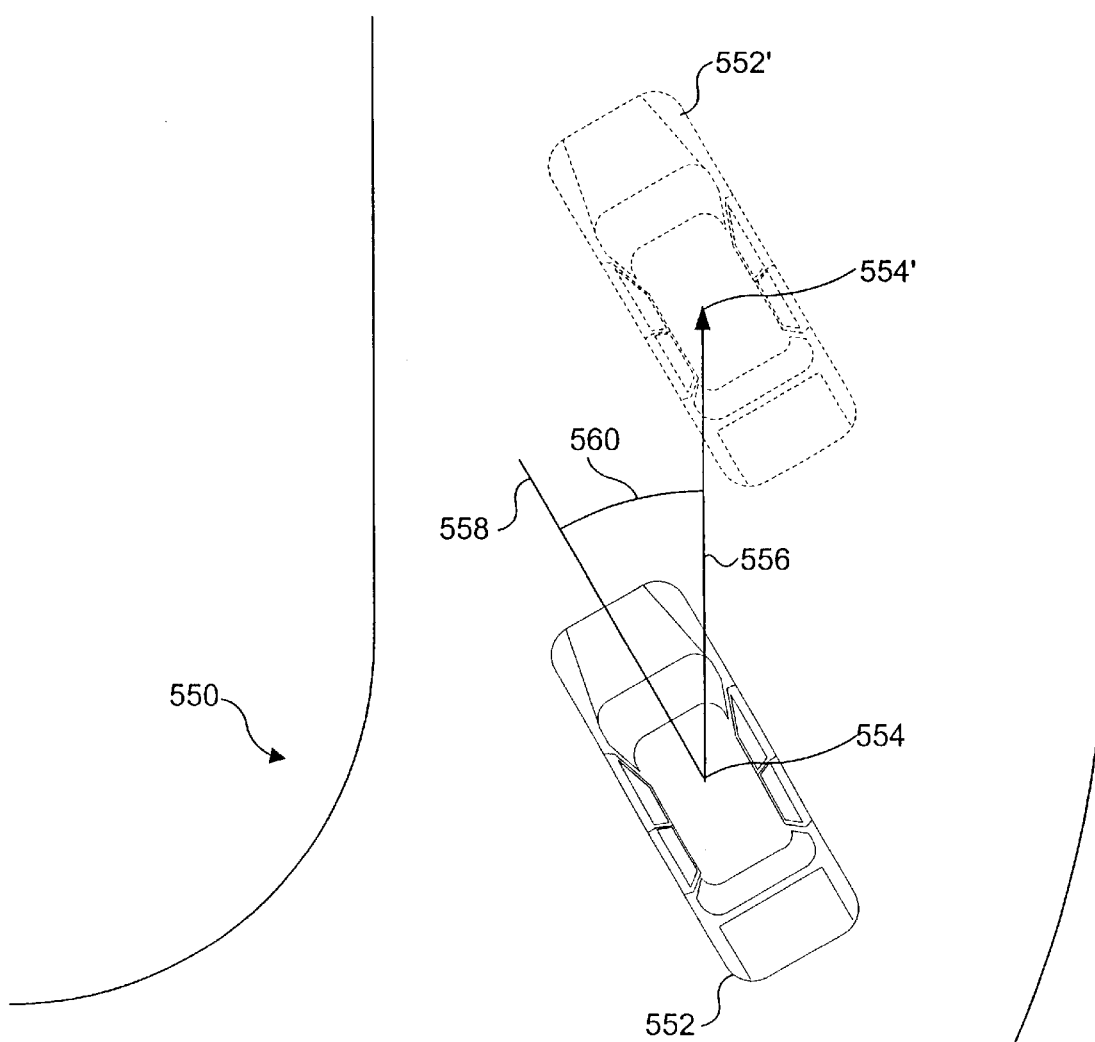
FIG. 8 is a diagram of a simulated automobile in a power slide and illustrating the parameters associated with the power slide.

As an example of a style feat, FIG. 8 illustrates a power slide. A car 552 is traveling on track 550 and moves from a first location 554 to a second location 554' along a path 556. However, axis 558 of car 552 defines an angle 560 relative to path 556. Angle 556 is determined based on the relative position of the car between two successive display frames. Two successive display frames establish first location 554 and second location 554' and thus establish path 556. Path 556 is measured in regard to axis 558 of the car to determine angle 560 during the slide. If angle 560 exceeds a predetermined threshold (e.g., 15°), and if other criteria are met (e.g., no collisions with objects or other cars occur), car 552 is deemed to be successfully performing a power slide along path 556.

Figure 9:
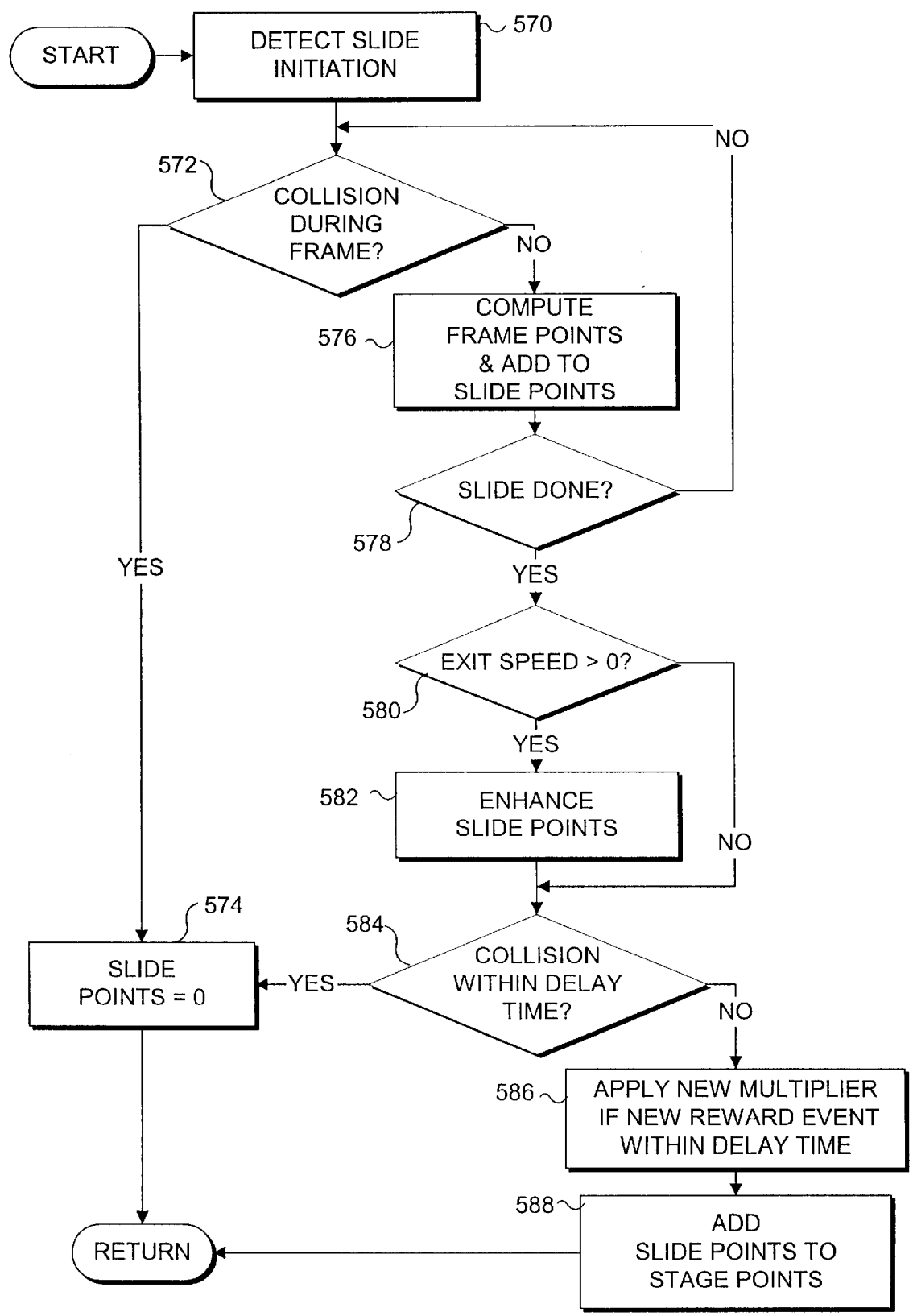
FIG. 9 is a flow diagram of logic used to determine the number of slide points awarded for a power slide.

FIG. 9 illustrates the logic used to determine the number of points awarded for a power slide (i.e., slide points). The power slide is a style feat, because it is not a necessary act and is not required to complete an event (race) in the game. In fact, it may be a detrimental act, from an objective standpoint, because car 552 will likely lose velocity as a result of the power slide. However, the player is still rewarded with slide points for the power slide, because the power slide is considered a stylish feat.

At a step 570, the game detects slide initiation. Slide initiation is based on a simulation of the actual physics that enable a car to slide. For example, the game includes a mathematical simulation of friction between the car's tire and the track. To determine slide initiation, the game logic detects a tire friction level that is below a friction threshold. The game logic also detects that the car has exceeded a threshold angle between the axis of the car and the path of travel. As further confirmation that the car is power sliding, and not just spinning, successive frames of the car's location are used to determine that the car's travel distance along the path of travel is greater than a distance threshold. When the game logic determines that the car is sliding, the speed of the car at the point the car began sliding is stored. The game logic then begins computing slide points on a frame-by-frame basis.

Specifically, at a decision step 572, the game first determines whether the car was involved in a collision during the frame. The car might collide with another car, a barrier, or other object. If the game determines that the car has collided with an object, the game sets the slide points to zero at a step 574. Thus, no slide points are awarded for the power slide if the car is involved in a collision, because the power slide is no longer considered stylish if the player did not maintain sufficient control during the power slide to avoid a collision. It should be apparent that this determination is subjective, depending on the game design. For example, it may be considered even more stylish if a player can intentionally power slide into a moving target, such as an opponent. A collision may also result in simply reducing the slide points rather than eliminating them altogether.

However, in this example, if no collision is detected during a frame, the game logic computes points for the frame at a step 576 and adds those frame points to the total slide points accumulated thus far. The number of points computed for one frame of sliding is preferably a function of a number of parameters, including the angle of the car as it slides, the distance the car slides within the frame, whether the car is sliding in a straightaway or curve, and/or other parameters. In addition, the number of points for a single frame may be further increased if one or more additional reward actions occur during the frame. For example, if during the power slide frame, the player also passes an opponent, the points computed for the frame may be multiplied by a predefined constant. Thus, the points for the stylish feat of power sliding are further increased as a reward for the more stylish feat of being able to pass an opponent while sliding.

Once the points are computed for a frame and added to the total slide points, the game determines, at a decision step 578, whether the slide has terminated during that frame. This determination is made in an inverse of the way used to determine slide initiation. If the power slide has not terminated, control returns to decision step 572 to process the next frame. If, however, the power slide has terminated, the game logic notes the car's exit speed from the slide and determines, at a decision step 580, whether the exit speed is greater than zero. If the exit speed is greater than zero, the game further increases the slide points, at a step 582. If, however, the power slide was terminated because the car came to a complete stop (without colliding), the slide points are not further increased. An increase in slide points for a positive exit speed may be based on the difference between the slide entry speed and the slide exit speed, or may be based only on the slide exit speed.

At a decision step 584, the game counts down a predetermined delay time (e.g., a predetermined number of frames), within which no other collision may occur. If a collision occurs after the power slide has terminated, but within the predetermined delay time, all of the accumulated slide points are lost at step 574, in this embodiment. It is not considered stylish to perform a power slide, then immediately thereafter collide with another object. If, however, no collision occurs within the predetermined delay time, but the player initiates another reward action within the delay time, yet another multiplier may be applied to the slide points, at a step 586. For example, if a player performs a power slide, then quickly pops the car up onto two wheels, the player is given additional points for combining the power slide with another stylish feat. The new reward action need not necessarily be a stylish feat. For example, the slide points may be multiplied if the player accomplishes a skill task, such as crossing the finish line, within the predetermined delay time after the power slide (or during a power slide frame). In any event, once the predetermined delay time has passed, and the total slide points are determined, the slide points are added to the points accumulated thus far for the stage, at a step 588.

Figure 10:
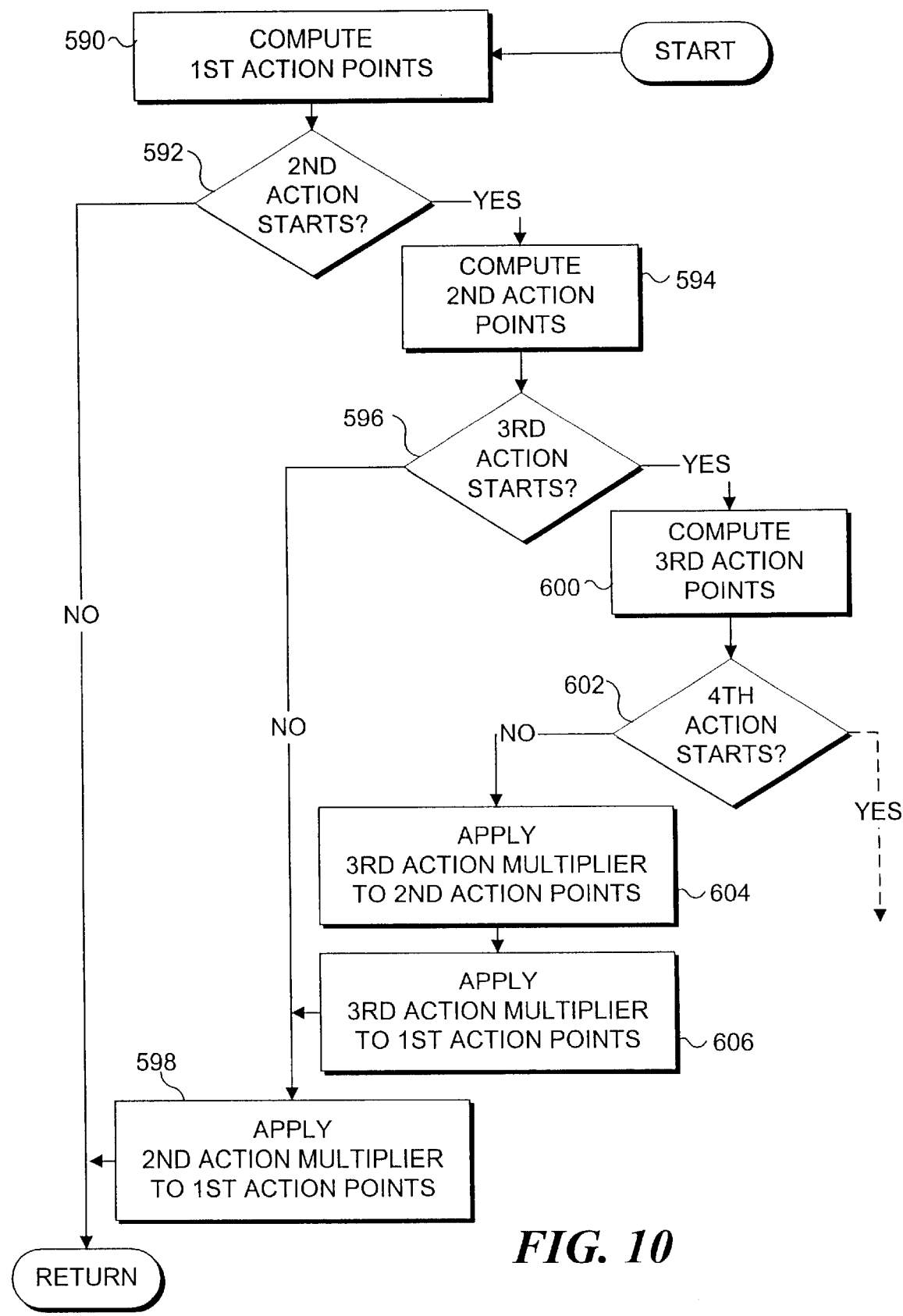
FIG. 10 is a flow diagram of logic used to apply one or more multipliers to event points awarded for performing two or more events at the same time, or for beginning one or more additional events within a short time after completing a previous event.

FIG. 10 is a flow diagram of logic used to apply one or more multipliers to points accumulated for performing two or more reward actions at the same time, or for beginning one or more additional reward actions in the short predetermined delay time, as described above. This logic illustrates that multipliers may be nested at multiple levels to increase the points awarded for skill tasks and style feats. Specifically, at a step 590, the game logic computes points given for a first reward action, such as the power slide discussed above. At a decision step 592, the game determines whether a second reward action was carried out, such as passing an opponent, while power sliding. If a second reward action is detected, the game computes separate points for the second reward action at a step 594. At a decision step 596, the game then determines whether yet another reward action was implemented. If a third reward action was not carried out, the game applies a second reward action multiplier to the first reward action points, at a step 598. For example, as discussed above, a multiplier is applied to the slide points for the power slide reward action if the player also passes an opponent while sliding.

If, however, a third reward action was initiated, the game computes separate points for the third reward action at a step 600. The process of nesting multipliers continues at a decision step 602, where the game determines whether a fourth reward action was initiated. Theoretically, this nesting can continue, limited only by the processing power of the game system, but in a practical sense, will likely be limited to two or three levels. As can be seen by step 604, if no fourth reward action was initiated, the game applies a third reward action multiplier to the second reward action points (e.g., to the points for passing an opponent). In addition, the third reward action multiplier is applied to the first reward action points (e.g., to the points for power sliding), at a step 606. As before, the second reward action multiplier is then applied to the first reward action points, at step 598. Thus, the points can be based not only on individual skill tasks and style feats, but also on combinations of skill tasks and style feats.

Although the present invention has been described in connection with the preferred form of practicing it and modifications thereto, those of ordinary skill in the art will understand that many other modifications can be made to the invention within the scope of the claims that follow. For example, enabling a player to set a goal in the game may be applied to almost any aspect of a game. Alternatively, or in addition, enabling a player to obtain points for a style feat that is not a necessary task of the game may be applied to any game that does not already require the style feat. Accordingly, it is not intended that the scope of the invention in any way be limited by the above description, but instead be determined entirely by reference to the claims that follow.

The invention in which an exclusive right is claimed is defined by the following:

1. A method of awarding points to a player in a game played using an electronic device that determines points awarded to each player, comprising the steps of:
   (a) enabling a player to set a goal for performance in the game;
   (b) determining a number of goal-based points applied by the electronic device for determining a status of the player in the game, as a function of the player's performance in relation to the goal set by the player; and
   (c) determining subjective points applied by the electronic device in determining the status of the player in the game, as a function of the player's performance as measured against a subjective criterion.

2. The method of claim 1, further comprising the step of determining objective points applied by the electronic device in determining the status of the player in the game, as a function of the player's performance as measured against an objective criterion, the status of the player in the game being based upon a total of the goal-based, subjective, and objective points awarded to the player in the game.

3. The method of claim 2, further comprising the step of deducting a number of points equal to a sum of the objective points and the subjective points, thereby canceling out the objective points and the subjective points, if the player fails to achieve the goal set by the player.

4. The method of claim 2, further comprising the step of determining a rating of the player's performance on a fixed scale as a function of the total of the goal-based, subjective, and objective points.

5. The method of claim 4, further comprising the step of enabling the player to advance to another level if the rating meets a predetermined threshold on the fixed scale.

6. The method of claim 1, wherein the step of determining subjective points comprises the step of awarding points as a function of a player's performance of a feat of style that is not a necessary task of the game.

7. The method of claim 6, wherein the feat of style includes one of power sliding, spinning, driving on two wheels, jumping into the air, blocking an opponent, avoiding obstacles, passing an opponent, somersaulting, twirling a weapon, and shooting backwards.

8. A game comprising:
   (a) a goal selector enabling a player to indicate a goal for a level of performance that the player expects to achieve during the game;

(b) a goal point counter that determines a number of goal-based points that will be awarded to the player as a function of the performance of the player in relation to achieving the goal indicated by the player; and (c) a subjective point counter that determines a number of subjective points that are awarded to a player for performing at least one action that is not an objective task of the game.

9. An electronic game system that enables a player to earn points at least in part as a function of successfully achieving a goal for a level of performance set by the player, comprising:

(a) an input device that enables a player to control a simulated player in a simulated game environment;

(b) a processor coupled to the input device;

(c) a display coupled to the processor for displaying the actions of the simulated player in the simulated game environment; and (d) a memory coupled to the processor that stores machine instructions causing the processor to:

(i) enable a player to set the goal for the level of performance in the game;

(ii) determine a number of goal-based points that will be awarded to a player in determining a status of a player in the game, as a function of a performance of a player in relation to the goal set by a player; and (iii) determine subjective points that will be awarded to a player in determining the status of a player in the game, as a function of a style performance of a player as measured against a predetermined subjective criterion.

10. The system of claim 9, wherein the machine instructions further cause the processor to determine objective points in determining the status of a player in the game, based upon whether a player successfully performs an objective task in the game, the status of a player in the game being a function of the goal-based, subjective, and objective points awarded to a player in the game.

11. A method of determining points awarded to a player in a game, comprising the steps of:

(a) enabling the player to set a goal of performance in the game;

(b) awarding points to the player as a function of the player successfully performing a subjective style feat; and (c) modifying the points that are awarded to the player in step (b) as a function of the performance of the player in relation to achieving the goal set by the player.

12. The method of claim 11, further comprising the step of modifying the points as a function of the player completing both an objective skill task and the subjective style feat.

13. The method of claim 11, wherein the step of enabling the player to set the goal comprises the step of enabling the player to establish a time within which the player will complete a task in the game.

14. The method of claim 11, wherein the step of enabling the player to set a goal comprises the step of enabling the player to indicate a minimum number of points that the player expects accumulate in at least a portion of the game.

15. The method of claim 11, further comprising the step of enabling the player to gamble that the player will achieve the goal of performance that the player set.

16. The method of claim 15, wherein if the player has gambled and is successful in achieving the goal of performance, further comprising the step of awarding more points to the player than would be awarded if the player had not gambled.

17. The method of claim 15, wherein the step of enabling the player to gamble comprises the step of deducting at least some points previously awarded to the player for failure by the player to achieve the goal of performance set by the player.

18. The method of claim 11, wherein an objective skill task is an undertaking that must be achieved by the player to complete a current stage in the game.

19. The method of claim 18, wherein a success of the player in achieving the undertaking is determined based on one of an elapsed time, a distance achieved, a speed achieved, a position achieved, a relative position achieved, and one or more subtasks achieved by the player.

20. The method of claim 11, wherein a subjective style feat is an act that is unnecessary to complete an objective skill task of the game.

21. The method of claim 20, wherein the act is performed in the course of completing an objective skill task of the game.

22. The method of claim 21, wherein the act is accomplished by one of:

(a) executing a trick; and (b) performing the act in a manner that substantially exceeds a defined level of performance.

* * * * *